(12) United States Patent
Harada et al.

(10) Patent No.: US 10,709,110 B2
(45) Date of Patent: Jul. 14, 2020

(54) ANIMAL EXERCISE WHEEL

(71) Applicant: Vium Inc, San Mateo, CA (US)

(72) Inventors: Kevin Harada, San Francisco, CA (US); Laura Schaevitz, Los Gatos, CA (US); Kyle Howard Heath, Menlo Park, CA (US); Jonathan Betts-LaCroix, Belmont, CA (US)

(73) Assignee: Vium Inc., San Mateo, CA (US)

( * ) Notice: Subject to any disclaimer, the term of this patent is extended or adjusted under 35 U.S.C. 154(b) by 260 days.

(21) Appl. No.: 15/850,665

(22) Filed: Dec. 21, 2017

(65) Prior Publication Data
US 2019/0191667 A1 Jun. 27, 2019

(51) Int. Cl.
A01K 15/02 (2006.01)
A01K 1/03 (2006.01)

(52) U.S. Cl.
CPC .............. A01K 15/027 (2013.01); A01K 1/03 (2013.01)

(58) Field of Classification Search
CPC ....... A01K 15/027; A01K 15/02; A01K 15/00
See application file for complete search history.

(56) References Cited

U.S. PATENT DOCUMENTS

| | | | | |
|---|---|---|---|---|
| 3,788,277 A * | 1/1974 | Willinger | ............. | A01K 15/027 119/700 |
| 3,994,262 A * | 11/1976 | Suchowski | ............. | A01K 1/035 119/700 |
| 4,064,839 A | 12/1977 | Rodemeyer | | |
| 5,088,446 A * | 2/1992 | Campiotti | ............. | A01K 1/031 119/421 |
| 5,125,361 A | 6/1992 | Rowlands | | |
| 5,649,503 A * | 7/1997 | Woolfolk | ............. | A01K 15/027 119/700 |
| 6,412,443 B1 * | 7/2002 | Miller | ................ | A01K 15/025 119/700 |
| 6,578,526 B2 * | 6/2003 | Hull | ...................... | A01K 15/02 119/700 |
| 6,959,667 B2 * | 11/2005 | Bordelon | ............... | A01K 13/00 119/610 |
| 7,770,539 B1 * | 8/2010 | Zimmerman | ........ | A01K 15/027 119/700 |
| 8,069,822 B2 * | 12/2011 | Ho | ....................... | A01K 15/027 119/700 |
| 8,191,511 B2 * | 6/2012 | Forest | ................ | A01K 15/027 119/421 |
| 9,901,076 B1 * | 2/2018 | Tucker | ................ | A01K 15/027 |
| 2003/0056735 A1 * | 3/2003 | Hull | ....................... | A01K 15/02 119/702 |

* cited by examiner

Primary Examiner — Kristen C Hayes
(74) Attorney, Agent, or Firm — Kim Rubin, Patent Agent

(57) ABSTRACT

An animal exercise device is described in the form a rotating wheel, generally cylindrical in form, open on one face for an animal to enter and exit, and solidly closed on the other face, which also provides a bearing for rotation. The wall and closed face are solid to avoid injury to an animal. The wheel's axis of rotation is at an angle from horizontal. The inside surface of the wall comprises spaced ridges for gripping by the animal's toes or feet. A contrasting marking on the outside surface of the wall aids vision-based rotation measurement. Embodiments are supported solely through the bearing and have no rotation drive other than use by an animal. Methods of use include automated measurement, using equipment external to the cage, of animal health and use in a multihoused cage where unique animal ID is associated with wheel use.

13 Claims, 5 Drawing Sheets

ANIMAL EXERCISE WHEEL

BACKGROUND OF THE INVENTION

Animal exercise wheels are often used in animal cages, such as for mice, rats, other rodents, or other animals.

Wheels, in the prior art, are in two common forms: an open wheel and a curved, rotating dish. Common wheels suffer from three problems: first, it can toss the animal outside the wheel or dish; second, the wheel or dish may accumulate bedding or detritus from the cage; and third, openings may injure the animal.

SUMMARY OF THE INVENTION

Embodiments overcome limitations in the prior art. One embodiment is in the form an open or half open wheel with a solid running surface, or a surface free of openings large enough to catch a toe or foot or otherwise injure the animal. The wheel is canted (tilted) by having its axis of rotation angled from horizontal. In this way, the lower portion of the running surface is angled downward towards the solid face to minimize the possibility of the animal being thrown out; and also while the top of the running surface is angled upwards from the solid face so that bedding or other detritus in the wheel tends to fly out when the wheel is spinning.

Another embodiment has ridges spaced around the running surface that the animal may use to grip with its toes or feet. To an extent, such ridges functionally replace the wires of a screen or mesh in a prior art wheel.

Yet another embodiment uses a contrasting color region, which may be rectangular on the outside surface of the wheel so that a vision system may count wheel rotations, compute wheel speed, or time wheel usage by an animal.

Yet another embodiment uses a vision system associated with a cage in which the wheel is deployed, wherein the vision system, responsive to movement of the contrasting color square: times wheel usage; counts wheel revolutions; measures wheel speed; or records wheel usage by identified animals in a cage with multiple animals ("multihoused").

Yet another embodiment additionally comprises a device or method to record activity of individual animals in a multihoused cage.

Yet another embodiment additionally comprises a device or method to measure health of one animal in a cage or of individual animals in a multihoused cage.

Yet another embodiment uses a vision system external to the cage to assist in any of the above embodiments of devices or methods.

Embodiments include devices, systems, and methods of using such devices in a cage, methods of measuring animal activity in a device, and systems such as a vivarium or study that use such devices.

DETAILED DESCRIPTION OF THE INVENTION

All embodiments, scenarios, examples, descriptions and drawings are non-liming.

Figure 1:
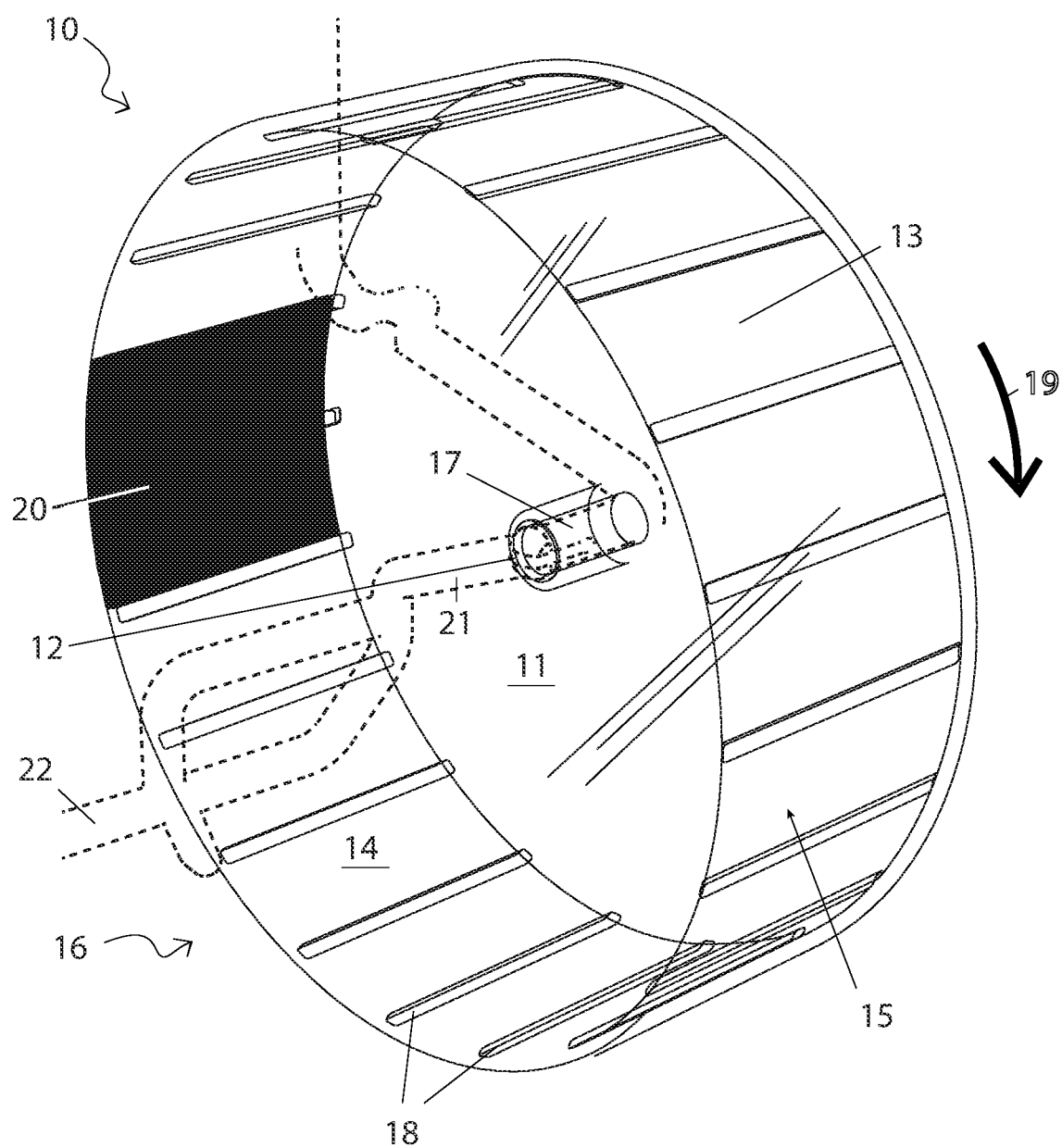
FIG. 1 shows one first embodiment of an animal exercise wheel.

FIG. 1 shows a first view of an embodiment of an animal exercise wheel. 10 is an overall wheel embodiment. This wheel is shown as transparent, such as manufactured from PET or acrylic material. 11 is the circular closed face. 12 is the wheel axis, which may be tilted from horizontal. 13 is the wheel perimeter wall, the inside surface 14 of which is the running surface for an animal. 15 shows the outside surface of the wheel perimeter wall. 16 shows the open portion of the wheel. 17 shows a bearing or bearing hole. 18 shows two exemplary ridges. The ridges provide gripping points for animal toes or feet. Ridge height and spacing is ideally a function of the animal type or size, or the size of the wheel. One embodiment uses ridge height in the range of 0.25 mm to 10 mm, or the range of 0.5 mm to 5 mm, or the range of 1 mm to 3 mm. 19 shows a wheel rotation. Embodiments permit a wheel to rotate in either direction. 20 shows a visually contrasting region on the perimeter wall. Other embodiments use a different element to automatically detect, count, time, and measure wheel rotations, such as a magnet, which can be easily detected using a Hall-effect sensor, which may be outside of a cage. Other embodiments use a radio frequency identification (RFID) chip on the wheel to automatically detect, count, time, and measure wheel rotations, which can be easily detected using an RFID sensor, which may be outside of a cage, such as shown 37 in FIG. 3. 21 in dotted outline shows an operative axle, which is not part of all embodiments. The axle may be monolithic and comprise two or more supports; wherein the supports may be adapted to mate with a cage furniture frame. Such a frame may be used in a cage to restrict the wheel to a specific location and orientation in the cage. 22 shows a monolithic extension to the wheel axle; the combination of 21 and 22 may be used as a rigid support for the wheel in addition to providing an axle. In some embodiments the only mechanical support for the wheel is the axle. The width of the wheel perimeter wall 13 determines the width of the wheel. The diameter of the perimeter wall 13 determines the diameter of the wheel and its circumference. The contrasting region 20 may extend the width of the wheel. It may extend from one percent of the wheel circumference to fifty percent of the circumference, or from two percent to thirty percent, or from five percent to twenty percent.

Figure 2A:
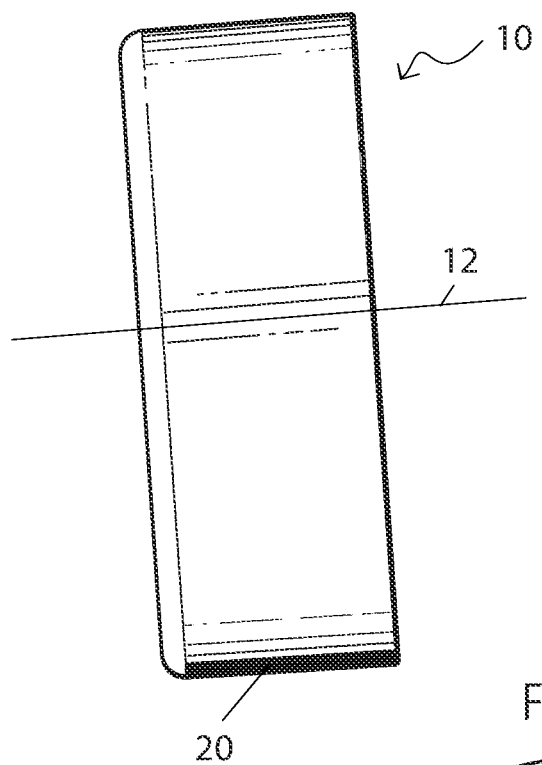
FIGS. 2A, 2B, and 2C show additional views of an embodiment.
Figure 2B:
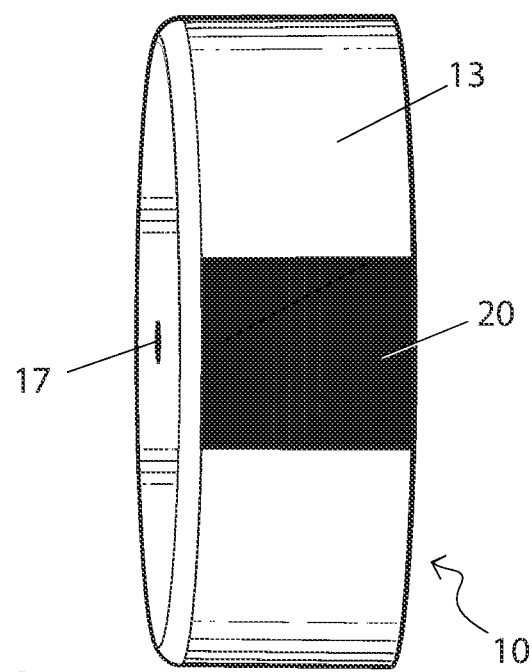
Figure 2C:
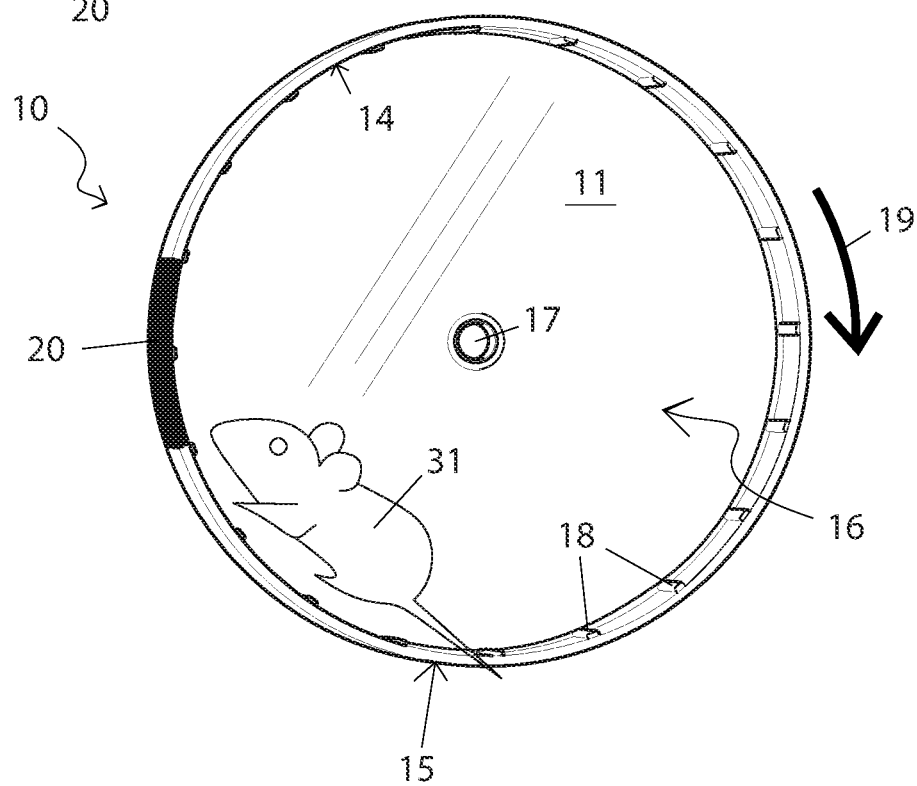

FIGS. 2A, 2B and 2C show three views of another embodiment of a wheel. This embodiment is opaque. Reference designators in these views with the same numbers as in other Figures are for the same element. Ridges on the inside surface of the perimeter wall are shown as 18 in FIG. 2C. The number of ridges varies by the type of animal and the size of the wheel. In one embodiment the number of ridges is in the range of 5 to 500; or in the range 8 to 100, or in the range of 10 to 50.

Figure 3:
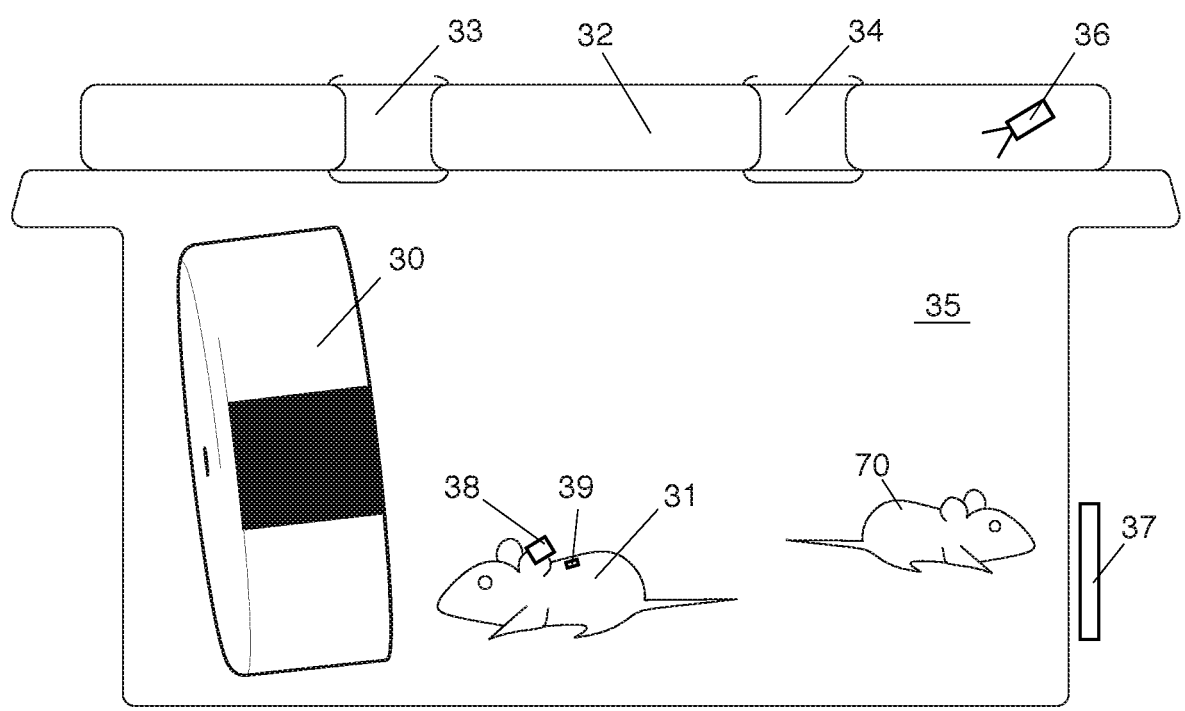
FIG. 3 shows an embodiment of a wheel in a multihoused cage.

FIG. 3 shows an embodiment of a wheel 30 in an animal cage 35. Note that the wheel axis is tilted. Tilt angle from horizontal is greater than zero degrees and less than 45 degrees. Tilt angle may be in the range of one degree to thirty degrees, or in the range of two degrees to fifteen degrees, or in the range of three degrees to ten degrees.

A support and bearing element for the wheel is not shown in FIG. 3. 36 shows a camera external to cage 35. 37 shows an RFID reader external to the cage 35. Such a reader may be used to uniquely identify animals in a multihoused cage. The reader 37 may be able to uniquely identify an animal when the animal is in only a particular region of the cage 35. Two animals 31 and 70 are shown in the cage 35. Animal 31 has an implanted RFID chip 39, such as may be read by reader 37. Animal 31 also has an ear tag 38, such as may be read by camera 36. Camera 36, RFID sensor 37, or other electronic sensors, outside the cage with no electrical penetrations through the cage, may be used both to uniquely identify animals, such as 31 and 70, in a multihoused cage 35, and to also, using either the same or different sensor, detect, count, time, and measure wheel rotations for wheel 30. Embodiments include associating a unique animal ID with wheel usage.

32 shows an optional package for electrics; here, shown above the cage 35 with no electronics penetrations through the cage 35. 33 and 34 show optional air in and air out vents or ducts for the cage 35. An electronic scale, ideally wireless, may be in the cage, not shown.

Figure 4:
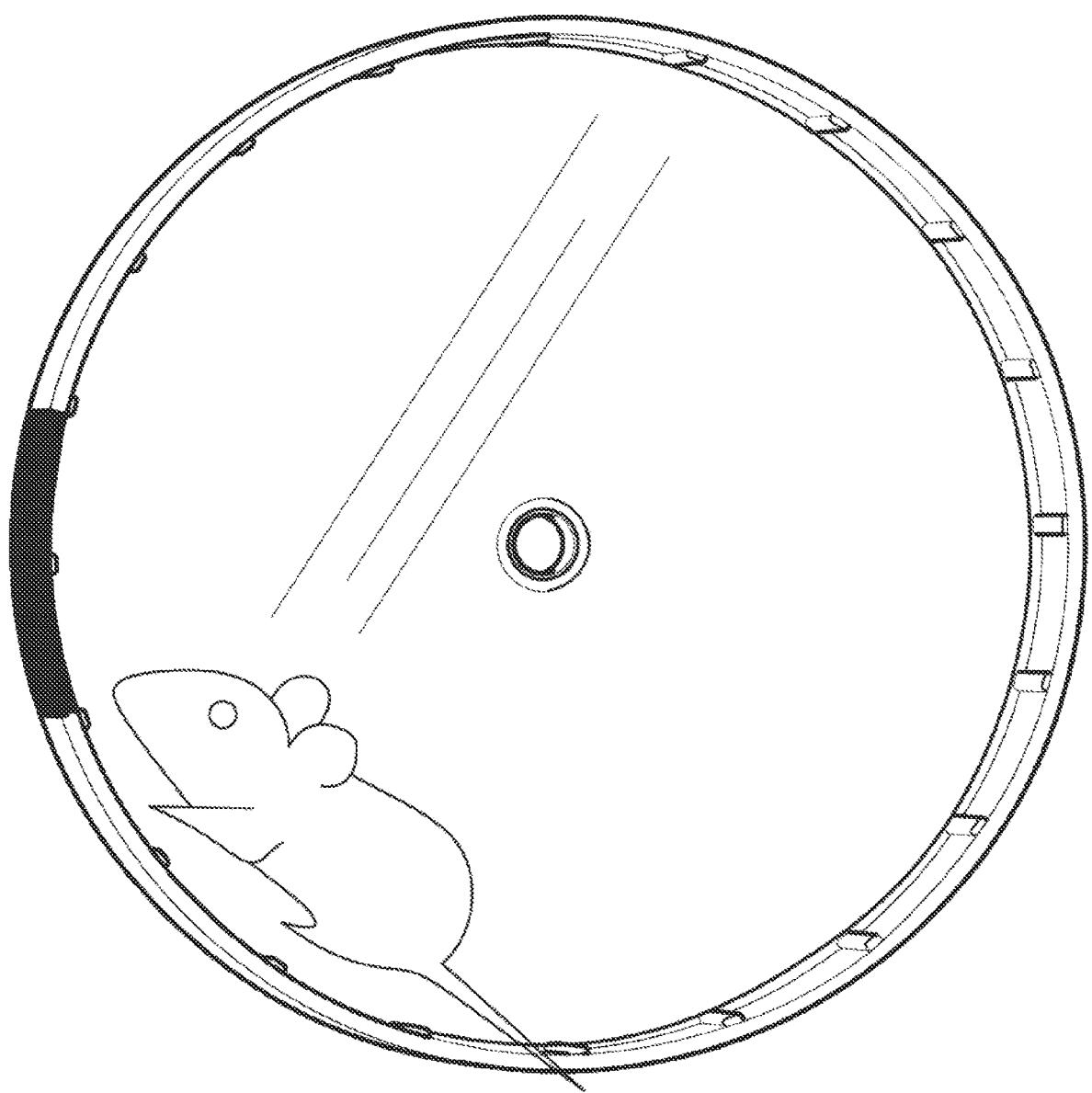
FIG. 4 shows an animal using a wheel.

FIG. 4 shows an exemplary animal, here a mouse, running in one embodiment of an exercise wheel. An axle, required for operation, is not shown.

Figure 5:
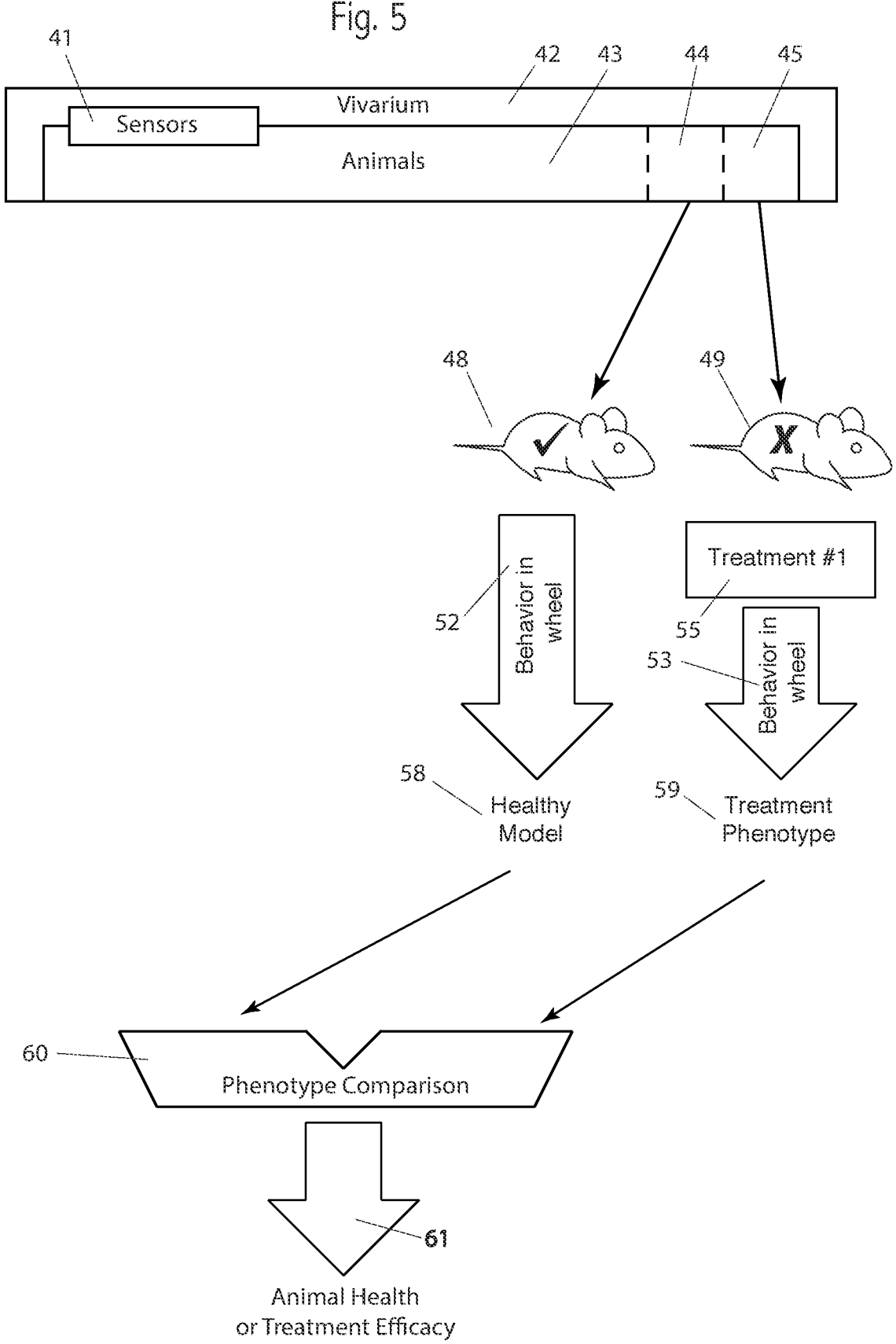
FIG. 5 shows method steps of an exemplary method of measuring animal health.

FIG. 5 shows a method used in a study to measure efficacy or other factors, such as side effects, of a treatment 55, using a wheel of an embodiment, and optionally other husbandry equipment or elements. A vivarium 42 houses animals 43 in cages such as 44 and 45. Sensors, such as infrared (IR) or color cameras, computer, non-transitory memory, lighting (both IR and visible spectra), and communication hardware, are shown, ideally outside cages, such as 44 and 45, with no electronic penetrations of those cages. Two exemplary animals are shown, 48 and 49, here from singly-housed cages 44 and 45 respectively. However, other embodiments use multihoused cages. Animal 48 is an exemplary animal that may be used either to create or validate a healthy animal model (also known as a phenotype); or, may be used as a control group, such as one that is exposed to the same vehicle (e.g., saline injection) or sham treatment as the animal group under test. Animal 49 is an exemplary animal from a group under test. Animal groups represented by animals 48 and 49 are in the same environment, including cages with the same or equivalent exercise wheel.

The animal behaviors are electronically observed, recorded and communicated, at least in part by sensors 41. Use of a contrasting mark, such as 20 in FIG. 1, on wheels 10 in FIG. 1, may be used to determine automatically wheel use including rotation counts, number of uses, times of uses, rotation speed, and other behavioral metrics. Animals represented by 48 receive no treatment 55, or a vehicle or sham treatment. Animals represented by 49 receive a test or treatment 55. It is important that (1) the animal environments, such as 44 and 45, for the two animal groups are as similar as possible; and (2) for some embodiment, that the only tests performed on the animals are the automated behavior observations. Some embodiments use husbandry-only actions or procedures for the animals, with the possible exception of the exposure of the animal 49 to a disease or syndrome, and a treatment under test 55. Similarly, some embodiments use only non-invasive testing. That is, there are no invasive tests; all behaviors and contributions to the healthy animal model 58 and phenotype 59, from both the model and control group, come solely from standard husbandry observations 52 and 53; this is novel over prior art. Exercise wheels and other husbandry elements and equipment are not shown in this Figure. In a multihoused environment, it is critical that a unique animal ID of an animal using the wheel be known; see also FIG. 3. Embodiments of methods using such an exercise wheel include measuring animal health; predicting time to death; disease progress, such as for multiple sclerosis, therapeutic treatment efficacy and side effects; response to a starting disease level; baseline modeling; genetic characterization; and model generation. Embodiments may also be used to determine a correlation, such as r-squared, between husbandry-behavior-only measurements and "gold-standard" or prior art measurements or procedures. Such correlations, either determination or use, may be for disease progression or treatment progress.

Behavior, phenotype, models, or test results 58 and 59 may be compared using statistical methods 60, which ideally generate 61 at least a correlation, such as r-squared, and a confidence metric.

Animal ID may be via an RFID implanted in or on an ear tag or otherwise affixed to each animal in the cage, or scale weight.

Animal ID may be via tracking an animal in the cage, using a vision system, from a point in the cage where animal ID is confidently determined, to entering the wheel.

Animal ID may be via confidently identifying all other animals in the cage, not including one animal using the wheel, thus uniquely identifying the one animal using the wheel.

All examples are sample embodiments. In particular, the phrase "invention" should be interpreted under all conditions to mean, "an embodiment of this invention." Examples, scenarios, and drawings are non-limiting. The only limitations of this invention are in the claims.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

All numerical ranges in the specification are non-limiting examples only. Use of curly braces in claims indicates a Markov set.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings. Embodiments of the methods of invention explicitly include all combinations of dependent method claim steps, in any functional order. Embodiments of the methods of invention explicitly include, when referencing any device claim, a substitution thereof to any and all other device claims, including all combinations of elements in device claims.

We claim:

1. An animal exercise wheel comprising:
a wheel axis;
a flat, circular face, disposed centered and normal to the wheel axis, comprising a central axle bearing;
a continuous, curved, solid, perimeter wall affixed proximal to a perimeter of the face, perpendicular to the face;
wherein the face and perimeter wall define an open cylindrical wheel volume, closed at the face and the perimeter wall and open opposedly from the face;
wherein the diameter of the perimeter wall defines a wheel diameter; wherein a width of the perimeter wall from a first wall edge to the opposing wall edge defines a wheel width;

wherein the perimeter wall comprises an inner surface and an outer surface;
wherein the wheel is adapted to rotate around the wheel axis;
wherein the face is free of openings injurious to an animal;
wherein an inside surface of the perimeter wall comprises a set of ridges, each ridge parallel to the wheel axis and extending from the first wall edge to the opposing wall edge; wherein the set of ridges extends fully around the inside surface of the perimeter wall; wherein each ridge has a ridge height and the set of ridges comprises a ridge spacing between ridges;
wherein the wheel axis is tilted at a wheel angle from horizontal greater than zero; wherein the wheel axis is lower at the face and higher at the open end of the cylindrical wheel volume;
wherein the wheel is free of any support except at the axle bearing; and
the perimeter wall is transparent or a first color, except for at least one contrast region comprising a second, contrasting color.

2. The animal exercise wheel of claim 1 wherein:
the at least one contrast region extends the width of the wheel and extends in the range of two percent to thirty percent of a circumference of the perimeter wall.

3. An animal exercise wheel comprising:
a wheel axis;
a flat, circular face, disposed centered and normal to the wheel axis, comprising a central axle bearing;
a continuous, curved, solid, perimeter wall affixed proximal to a perimeter of the face, perpendicular to the face;
wherein the face and perimeter wall define an open cylindrical wheel volume, closed at the face and the perimeter wall and open opposedly from the face;
wherein the diameter of the perimeter wall defines a wheel diameter; wherein a width of the perimeter wall from a first wall edge to the opposing wall edge defines a wheel width;
wherein the perimeter wall comprises an inner surface and an outer surface;
wherein the wheel is adapted to rotate around the wheel axis;
wherein the face is free of openings injurious to an animal;
wherein an inside surface of the perimeter wall comprises a set of ridges, each ridge parallel to the wheel axis and extending from the first wall edge to the opposing wall edge; wherein the set of ridges extends fully around the inside surface of the perimeter wall; wherein each ridge has a ridge height and the set of ridges comprises a ridge spacing between ridges;
wherein the wheel axis is tilted at a wheel angle from horizontal greater than zero; wherein the wheel axis is lower at the face and higher at the open end of the cylindrical wheel volume;
wherein the wheel is free of any support except at the axle bearing; and
wherein the wheel axis tilt angle is in the range of two to fifteen degrees from horizontal, inclusive.

4. The animal exercise wheel of claim 3 wherein:
the axle bearing comprises a bushing, perpendicular to the face, wherein the bushing is a monolithic portion of a monolithic wheel.

5. A method of measuring animal health comprising:
placing an exercise wheel of claim 3 into an animal cage;
placing one or more animals in the animal cage;
observing, recording and communicating a number and time of rotations of the wheel;
comparing the number and times of wheel rotations to a reference model;
wherein the animal health comprises a scalar health value and a scalar confidence value responsive to the comparing.

6. The method of claim 5 wherein:
the cage is free of electronic penetrations.

7. The method of claim 5 wherein:
the cage comprises a plurality of animals;
wherein the cage comprises an electronic device to automatically determine a unique animal ID of each animal using the wheel;
wherein the cage is free of electronic penetrations;
and the additional step:
determining a unique animal ID of an animal using the wheel.

8. The method of claim 5 comprises the additional step:
measuring and recording responsive to a vision system and wheel rotation wheel usage, comprising any combination of {wheel rotations; wheel speed, wheel usage times; and identification of an animal using the wheel};
wherein the vision system is external the cage and comprises both infrared illumination of the cage interior and visible light illumination of the cage interior.

9. The method of claim 5 wherein:
the animal cage comprises a single sensor, outside the cage;
wherein the animal cage is free of electronic penetrations;
wherein the observing uses the single sensor;
and comprising the additional step:
identifying uniquely an animal in cage using the single sensor;
associating data from the observing, recording, and communicating with the animal uniquely identified in the identifying step.

10. The method of claim 9 wherein:
the single sensor is a video camera.

11. A method of recording animal health comprising the steps:
placing the wheel of claim 1 in a cage adapted to multihoused animals;
placing one or more animals in the cage;
placing a vision system outside the cage;
placing an animal identification system outside the cage adapted to uniquely identify each of the multihoused animals;
measuring and recording for each multihoused animal, responsive to the vision system, wheel rotation, and unique animal identification any wheel usage combination of the set of: {wheel rotations; wheel speed, wheel usage times}, for any combination of any number of elements from the set;
associating the measured and recorded wheel data with individual, uniquely identified animals in the cage;
comparing the recorded wheel usage combination of the each uniquely identified animal to a wheel usage model;
computing both a numerical distance scalar and confidence scalar responsive to the comparing, of each multihoused animal;
wherein the animal health of each multihoused animal is a metric responsive to the numerical distance scalar and confidence scalar of the each animal.

12. The method of claim 11 further comprising:
generating a time-based graph of the animal health wherein the frequency of points on the graph is at least daily.

13. The method of claim 11 further comprising:
generating a time-based graph of the animal health wherein the frequency of points on the graph is at least four times daily.

* * * * *